United States Patent [19]
Hendrix et al.

[11] Patent Number: 5,668,535
[45] Date of Patent: Sep. 16, 1997

[54] FILTER CONDITION SENSOR AND INDICATOR

[75] Inventors: George E. Hendrix, Florissant; Karmen D. Cox, St. Peters, both of Mo.

[73] Assignee: Emerson Electric Co., St. Louis, Mo.

[21] Appl. No.: 568,813

[22] Filed: Dec. 7, 1995

[51] Int. Cl.$^6$ ................................................ G08B 21/00
[52] U.S. Cl. ............................ 340/607; 340/606; 340/608; 55/215; 55/311
[58] Field of Search ............................... 340/606, 608, 340/607, 588, 589; 55/213, 215, 311

[56] References Cited

U.S. PATENT DOCUMENTS

| | | | |
|---|---|---|---|
| 3,653,375 | 4/1972 | Raffel | 128/33 |
| 4,040,042 | 8/1977 | Mayer | 340/239 |
| 4,050,291 | 9/1977 | Nelson | 73/38 |
| 4,240,072 | 12/1980 | Fowler | 340/664 |
| 4,294,595 | 10/1981 | Bowerman | 55/213 |
| 5,429,649 | 7/1995 | Robin | 55/215 |

Primary Examiner—Jeffery Hofsass
Assistant Examiner—Timothy Edwards, Jr.
Attorney, Agent, or Firm—Polster, Lieder, Woodruff & Lucchesi

[57] ABSTRACT

A filter condition sensor and indicator is disclosed. A filter condition sensor and indicator that responds to the presence of a predetermined collection of material in a filter operatively positioned in an output air flow path. A small by-pass air flow path is connected to the output air flow path and is separate from the filter. A heated thermistor is positioned in the by-pass air flow path. Electrically connected in series with the heated thermistor is an indicator light that illuminates when the resistance in the circuit is decreased due to predetermined cooling of the heated thermistor. In this way, a predetermined collection of material in the filter increases the flow of air in the small by-pass air flow path for cooling the heated thermistor and for lowering the resistance in the circuit to illuminated the indicator light. Even in those instances where a multi-speed fan is located in the output air flow path, the present invention overcomes changing fan speeds and changing air velocity by coupling the thermistor in a circuit which changes the voltage and current through the thermistor depending on the fan setting.

9 Claims, 2 Drawing Sheets

U.S. Patent     Sep. 16, 1997     Sheet 1 of 2     5,668,535
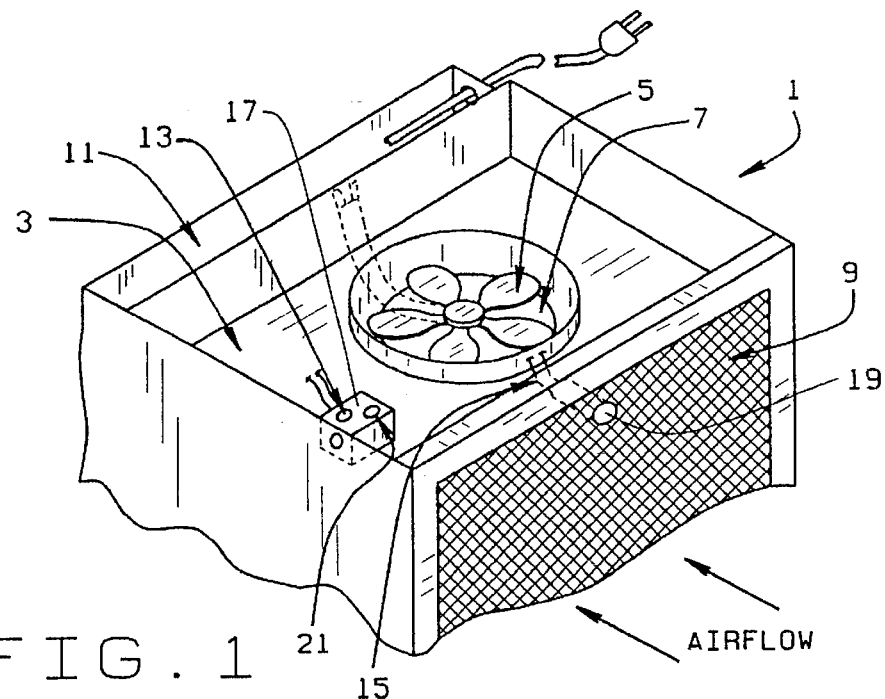
FIG. 1
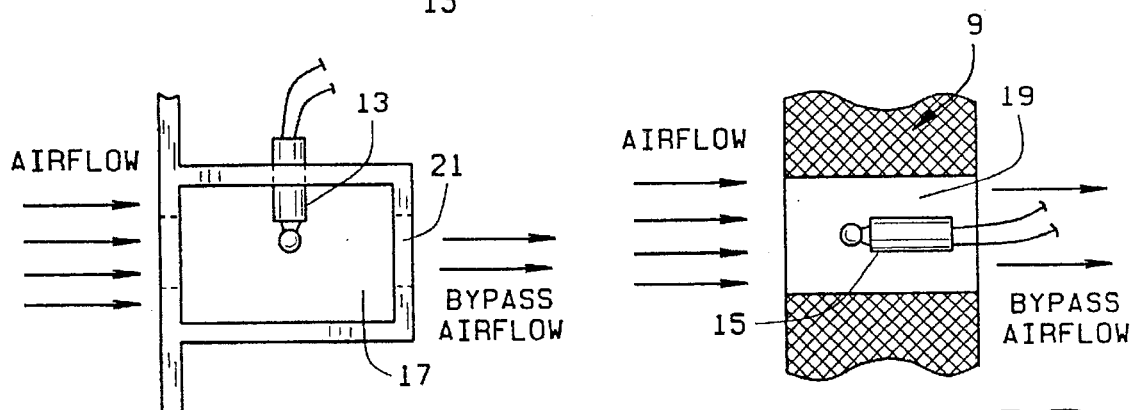
FIG. 2A
FIG. 2B
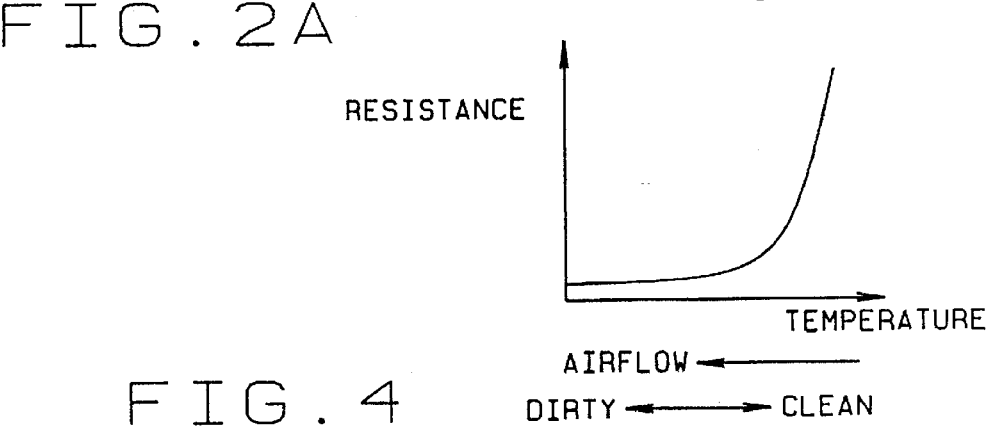
FIG. 4

FILTER CONDITION SENSOR AND INDICATOR

BACKGROUND OF THE INVENTION

The present invention relates to a filter condition sensor and indicator, and more particularly, to a filter condition sensor and indicator that responds to the presence of a predetermined collection of material in a filter that is operatively positioned in an output air flow path which may include a multi-speed fan.

In a product such as a humidifier, vacuum cleaner or other product containing a filter, it is desirable to know when the filter is clogged since this can adversely affect performance. Typically, a clogged filter is one where the air pressure drop across the filter increases.

The prior art has suggested various ways in which a clogged filter can be indicated to a user. U.S. Pat. No. 4,050,291 discloses heated thermistors used in a bridge circuit with a filter sensor and indicator device; U.S. Pat. No. 4,040,042 teaches the use of a current sensing resistor in a blower energizing circuit; and U.S. Pat. No. 4,240,072 discloses an energy sensor in the form of a closed loop flux conducting circuit. All of these prior art techniques have proved to be useful for certain applications.

Sensing the condition of a filter and providing a visual indication of the filter to the user becomes more complicated when a multi-speed fan is used in a product such as those identified above. When the fan speed in changed, the velocity of air through the filter is also changed, and this may cause the indicator to "trip" when the filter is not clogged or fail to indicate a clogged filter.

The present invention has been constructed specifically to overcome the aforementioned problems in a new and improved construction not previously taught or suggested by the prior art.

SUMMARY OF THE INVENTION

Among the several objects and advantages of the present invention include:

A new and improved filter condition sensor and indicator for a product such as a humidifier, vacuum cleaner or other similar product containing a filter;

The provision of the aforementioned filter condition sensor and indicator which is separate from an output air flow path containing the filter;

The provision of the aforementioned filter condition sensor and indicator in which a small by-pass air flow path contains a heated thermistor which illuminates when resistance in an electrical circuit containing the thermistor and indicator light decreases;

The provision of the aforementioned filter condition sensor and indicator in which the thermistor is electrically coupled to means for changing the voltage and current through the thermistor where a multi-speed fan is located in the output air flow path;

The provision of the aforementioned filter condition sensor and indicator which is simple, durable, economical, requires low maintenance and is otherwise well adapted for the purposes intended.

Briefly stated, the filter condition sensor and indicator of the present invention responds to the presence of a predetermined collection of material in a filter that is operatively positioned in an output air flow path. A small by-pass air flow path is connected to the output air flow path and is separate from the filter. A heated thermistor is placed in the by-pass air flow path. Electrically connected in series in a circuit with the heated thermistor is an indicator light that illuminates when the resistance in the circuit is decreased due to predetermined cooling of the heated thermistor. Thus, a predetermined collection of material in the filter increases the flow of air in the small by-pass air flow path for cooling the heated thermistor and lowering resistance in the circuit to illuminate the indicator light.

The heated thermistor may be connected in series with the resistor whose resistance is lowered when the air flow in the by-pass air flow path is increased. The thermistor is preferably a positive temperature coefficient thermistor for air flow sensitivity that permits rapid change of resistance.

The small by-pass air flow path may extend through the filter or outside the filter, depending upon the construction that is preferred.

Where a multi-speed fan is located in the output airflow path, the thermistor is electrically coupled to means for changing the voltage and current through the thermistor depending on the fan setting. The last mentioned means may comprise tapped coils of a multi-speed motor that operates the multi-speed fan. The last mentioned means may also comprise a switch that changes the resistance in the thermistor as the fan speed is changed.

These and other objects and advantages will become apparent from the description that follows.

BRIEF DESCRIPTION OF THE DRAWINGS

In the drawings, FIG. 1 is a fragmentary perspective view of an upper area of a humidifier showing a multi-speed fan and an output air flow path containing a filter;

FIG. 2A is a fragmentary side elevational view, partially in section, of a heated thermistor used in a separate by-pass air flow path according to the present invention;

FIG. 2B is a fragmentary side elevational view, partially in section, of a heat thermistor used in connection with humidifier filter;

FIG. 4 is a graphic illustration charting resistance and temperature in connection with dirty and clean air flow through a filter.

Corresponding reference numerals will be used throughout the several figures of the drawings.

DESCRIPTION OF THE PREFERRED EMBODIMENTS

Figure 3:
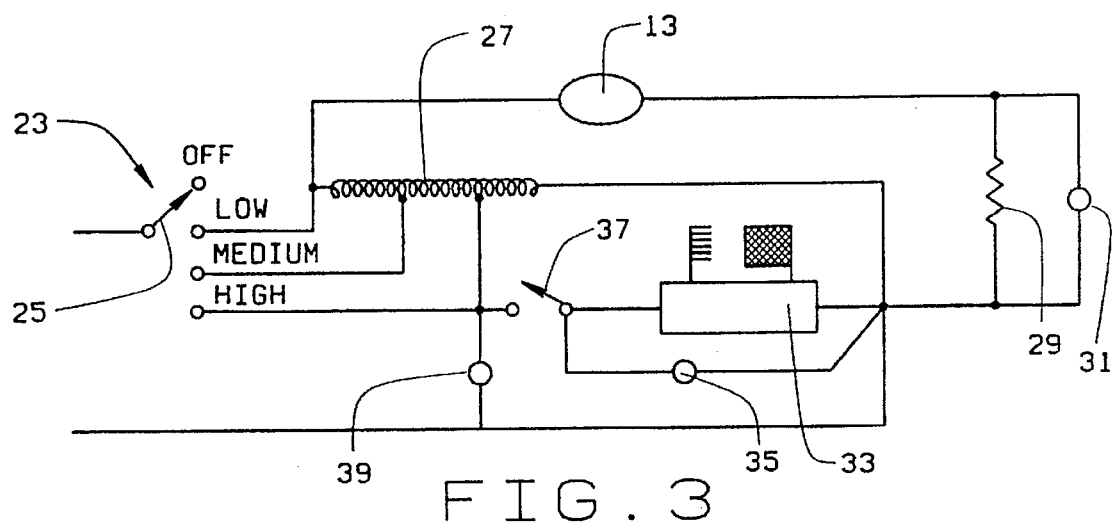
FIG. 3 is a schematic view of a typical electric circuit used in connection with a filter condition sensor and indicator of the present invention and showing an auto-transformer as the tapped coils of a multi-speed motor.

The following detailed description illustrates the invention by way of example and not by way limitation. This description will clearly enable one skilled in the art to make and use the invention, and describes several embodiments, adaptions, variations, alternatives and uses of the invention, including what I presently believe is the best mode of carrying out the invention.

While the filter condition sensor and indicator of the present invention can be used in a variety of different products such as a humidifier, vacuum cleaner or any other product containing a filter, FIG. 1 of the drawings disclose the present invention in connection with a humidifier. At the upper end of the humidifier 1 is a compartment 3 that contains a motor driven multi-speed fan blade 5 that is positioned in an output air flow path 7 for drawing air through the humidifier, as is well known. At one side of the humidifier 1 is a filter 9 which typically is associated with an air inlet (not shown) for trapping foreign particles and other debris that are drawn into the humidifier 1 by the motor driven multi-speed fan blade 5. A molded screen (not shown) is typically mounted on top of the humidifier 1, to cover one or more of the compartments and the multi-speed fan blade 5.

As indicated above, it is important to sense the condition of the filter 9 in order to provide a visual indication to a user when the filter becomes clogged. As will be appreciated, a clogged filter can adversely affect performance of a product, such as the humidifier 1. This problem becomes more complicated when a multi-speed fan is used, as in the motor driven multi-speed fan blade 5 shown in FIG. 1. When the speed of the fan blade 5 is changed, the velocity of the air through the filter will also be changed, and this may cause any filter condition sensor and indicator to "trip" when the filter is not clogged or fail to indicate a clogged filter.

To overcome these problems, the present invention discloses a new and improved filter condition sensor and indictor which responds to the presence of a predetermined collection of material in the filter that may be operatively positioned in an output air flow path which may include a multi-speed fan, such as the environment illustrated in FIG. 1 of the drawings.

Adjacent the compartment 3 in the humidifier 1 is a compartment 11 which may contain various electrical conduit. A heater thermistor 15 maybe used in connection with the filter 9. Alternatively, a thermistor 13 may be provided in a compartment 17, adjacent one side of the compartment 3, if desired.

This is best illustrated in FIGS. 2A and 2B of the drawings where a thermistor 13 is shown as being used in connection with the filter 9 "(FIG. 2B)" as well as the alternative arrangement of a thermistor 15 which may be used in the separate compartment 17 "(FIG. 2A)". Whichever construction is used, it is important that a small by-pass air flow path be connected to the output air flow path 7 separate from the filter 9. As shown in "FIG. 2B" of the drawings, the heated thermistor 15 is placed in a separate by-pass air flow path 19 which extends through but allows air to flow around the filter 9. The separate by-pass air flow path 19 is connected through the various compartments at the upper end of the humidifier 1 to the output air flow path 7. Alternatively, "as shown in FIG. 2A" the heated thermistor "13" may be placed in the separate compartment 17 constituting a small by-pass air flow path which is also connected to the output air flow path 7 separate from the filter 9. In the case of the separate compartment small by-pass air flow path 17, an air outlet 21 is necessary in order to allow air passing through the small by-pass air flow path 17 to be discharged out the air outlet 21.

As shown in the graphic illustration in FIG. 4 of the drawings, as the air velocity increases in the small by-pass air flow path 17 or 19, due to clogging in the filter 9, the thermistor 13 or 15 will be cooled more and its resistance decreases. By using a positive temperature coefficient thermistor (PTC) for the thermistors 13 or 15 and by coupling same in series with a resistor, the increased air velocity in the small by-pass air flow path 17 or 19 can be made more precipitous such that at a low air flow, the resistance in the thermistor 13 or 15 is very high and at a certain increased air flow, the heated thermistors 13 or 15 can be switched to a much lower resistance. This large change of resistance can be used to light an indicator across either of the thermistors 13 or 15 on a resistor in series with either of the thermistors 13 or 15.

FIG. 3 of the drawings shows a typical electrical circuit 23 used in connection with the filter condition sensor and indicator of the present invention where an auto-transformer comprises the tapped coils 2 of a multi-speed motor. At the left hand side of the circuit 23, a multi-position switch 25 is shown as operating between low, medium or high positions in controlling the motor driven multi-speed fan blade 5. The thermistor 13 illustrated in FIG. 3 (which could be the thermistor 15 as well) is electrically coupled to the tapped coils 27 of a multi-speed motor (not shown) that operates the motor driven multi-speed fan blade 5. A resistor 29 extends across the circuit 23 in conjunction with the indicator light 31. A separate ion generator 33 may also be coupled to an ion light 35 through a manual switch 37 in the electrical circuit 23, if desired. Also, a power light 39 may be used to indicate power in the system.

By coupling the thermistor 13 with the tapped coils 27 of a multi-speed motor (not shown), the voltage and current through the thermistor can be changed, depending on the fan setting. The tapped coils 27 of the multi-speed motor (not shown) are effectively used as an auto-transformer to change the voltage applied to (and the current through) the thermistor 13 and the series resistor 29, depending on the fan setting. Thus, at high fan speed, the voltage across the thermistor 13 and the series resistor 29 is increased such that a higher air velocity in one or the other of the small by-pass air flow paths 17, 19 is required to indicate a clogged filter. In this way, the effects of the motor driven multi-speed fan blade 5 may be compensated.

The thermistor indicator light 31 is electrically connected in series with the heated thermistor 13 for illumination when the resistance in the circuit 23 is decreased due to a predetermined cooling of the heated thermistor. As a result, a predetermined collection of material in the filter 9 increases the flow of air in the small by-pass air flow path 17 or 19, in order to cool the heated thermistor 13 or 15 for lowering the resistance in the circuit, such as through the resistor 29, in order to illuminate the indicator light 31. Preferably, the thermistor 13 or 15 is a positive temperature coefficient thermistor (PTC) for air flow sensitivity that permits rapid change of resistance.

Figure 5:
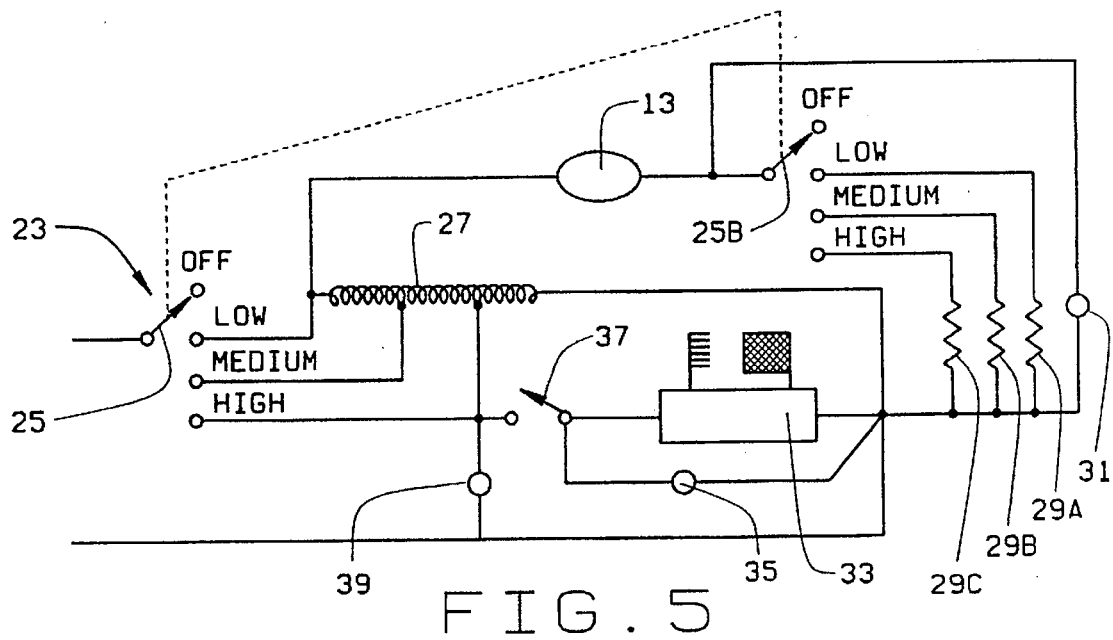
FIG. 5 is a schematic view of a typical electric circuit used in the filter condition sensor and indicator of the present invention and showing a switch that changes the resistance in a resistor as the fan speed is changed.

In lieu of using the tapped coils 27 of a multi-speed motor (not shown) to change the voltage and current through the thermistor 13 when a motor driven multi-speed fan blade 5 is used, a switch that changes the resistance in the thermistor as the fan speed is changed, may also be used. This is shown in FIG. 5 of the drawings where ganged switches and 25 and 25B respectively, select the desired speed tap on the motor and the appropriate resistor 29A, 29B or 29C. Thus, resistor 29A would have a relatively high value to reduce current through and heating in thermistor 13 so that it would trip (go through the abrupt change of resistance as shown in FIG. 4) in order to illuminate indicator light 31 at the desired point (air flow) at low fan speeds. Resistor 29C would have a relatively low value to increase current through and heating in thermistor 13 to compensate for the increased cooling of the thermistor 13 at high fan speeds so that it would trip and illuminate indicator light 31 at the desired point at high fan speeds. Resistor 29B would have an appropriate intermediate value. In either instance of FIGS. 2A or 2B, the voltage and current through the thermistor will be changed, depending on the fan setting.

From the foregoing, it will now be appreciated that the filter condition sensor and indicator of the present invention discloses a new and improved construction that senses the condition of a filter and provides a visual indication of the filter to a user, such as through an indicator light, even when a multi-speed fan is used in a product such as a humidifier, vacuum cleaner or other such appliance. Even when the fan speed is changed, the velocity of air through the filter will also be changed, and this will not cause the sensor to "trip" when the filter is not clogged or fail to indicate a clogged filter.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

We claim:

1. A filter condition sensor and indicator for responding to the presence of a predetermined collection of material in a filter operatively positioned in an output air flow path comprising:

a small by-pass air flow path connected to the output air flow path and separate from the filter;

a heated thermistor in the by-pass air flow path; and an indicator light electrically connected in series in a circuit with the heated thermistor that illuminates when the resistance in the circuit is decreased due to predetermined cooling of the heated thermistor whereby a predetermined collection of material in the filter increases the flow of air in the small by-pass air flow path for cooling the heated thermistor and lowering resistance in the circuit to illuminate the indicator light; and a multi-speed fan in the output air flow path, said thermistor being electrically coupled to means for changing the voltage and current through the thermistor depending on the fan setting.

2. The filter condition sensor and indicator as defined in claim 1 wherein the thermistor is a positive temperature coefficient thermistor for air flow sensitivity that permits rapid change of resistance.

3. The filter condition sensor and indicator as defined in claim 1 wherein the means for changing the voltage and current through the thermistor comprises tapped coils of a multi-speed motor that operates the multi-speed fan.

4. The filter condition sensor and indicator as defined in claim 1 wherein the means for changing the voltage and current through the thermistor comprises a switch that changes the resistance in a thermistor circuit as fan speed is changed.

5. The filter condition sensor and indicator as defined in claim 1 wherein the small by-pass air flow path extends outside of the filter.

6. The filter condition sensor and indicator as defined in claim 1 wherein the small by-pass air flow path extends through the filter.

7. A filter condition sensor and indicator for responding to the presence of a predetermined collection of material in a filter operatetively positioned in an output air flow path including a multi-speed fan;

a small by-pass air flow path connected to the output air flow path and separate from the filter;

a heated thermistor in the by-pass air flow path, said heated thermistor being electrically connected in series with a resistor;

an indicator light also electrically connected in series with the heated thermistor and in parallel with the resistor that illuminates when the resistance in the resistor is decreased due to predetermined cooling of the heated thermistor; and said thermistor and resistor being electrically connected to an auto-transformer for changing the voltage and current through the thermistor and thermistor depending of the setting of the multi-speed fan;

whereby a predetermined collection of material in the filter increases the flow of air in the small by-pass air flow path for cooling the heated thermistor and lowering resistance in the thermistor to illuminate the indicator light.

8. The filter condition sensor and indicator as defined in claim 7 wherein the auto-transformer comprises tapped coils of a multi-speed motor that operates the multi-speed fan.

9. The filter condition sensor and indicator as defined in claim 7 wherein the auto-transformer comprises a switch that changes the resistance in the resistor as the fan speed is changed.

* * * * *